(12) United States Patent
Donaldson et al.

(10) Patent No.: US 8,975,790 B2
(45) Date of Patent: Mar. 10, 2015

(54) AC MAINS FILTER AND POWER SUPPLY SYSTEM

(75) Inventors: Chris Donaldson, Greenville, SC (US); David Halverson, Sparatanburg, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 612 days.

(21) Appl. No.: 12/668,995

(22) PCT Filed: Oct. 23, 2008

(86) PCT No.: PCT/US2008/081002
§ 371 (c)(1),
(2), (4) Date: Jan. 13, 2010

(87) PCT Pub. No.: WO2009/055602
PCT Pub. Date: Apr. 30, 2009

(65) Prior Publication Data
US 2010/0203762 A1    Aug. 12, 2010

Related U.S. Application Data

(60) Provisional application No. 60/982,215, filed on Oct. 24, 2007.

(51) Int. Cl.
*H01R 13/66* (2006.01)
*H02M 1/12* (2006.01)
*H02M 7/00* (2006.01)
(Continued)

(52) U.S. Cl.
CPC .............. *H02M 1/12* (2013.01); *H02M 7/003* (2013.01); *H01R 13/719* (2013.01); *H01R 31/065* (2013.01)

USPC .......................................................... 307/149

(58) Field of Classification Search
CPC ...................................................... H01R 13/719
USPC ....................................... 307/149; 439/620.09
See application file for complete search history.

(56) References Cited

U.S. PATENT DOCUMENTS

| | | | |
|---|---|---|---|
| 5,115,368 A * | 5/1992 | Smith | 361/56 |
| 5,234,360 A * | 8/1993 | Kramer, Jr. | 439/505 |
| 5,334,033 A * | 8/1994 | Milan | 439/214 |

(Continued)

FOREIGN PATENT DOCUMENTS

| EP | 0090774 B1 * | 10/1983 |
|---|---|---|
| EP | 0 920 116 B1 | 4/2003 |

(Continued)

OTHER PUBLICATIONS

Full Translation for JP04154204.*

(Continued)

*Primary Examiner* — Fritz M Fleming
(74) *Attorney, Agent, or Firm* — Sughrue Mion, PLLC

(57) ABSTRACT

A power supply system with a filter with at least a first and second connector, wherein the first connector is connected to a power source and the second connector is connected to a power supply. A power supply system with a first filter with at least a first and second connector, a second filter with at least a third and fourth connector, wherein the first connector is connected to a power source, wherein the first filter is connected to the second filter, and the fourth connector is connected to a power supply. A filter with a housing, a male connector, and a female connector.

15 Claims, 5 Drawing Sheets

(51) Int. Cl.
*H01R 13/719* (2011.01)
*H01R 31/06* (2006.01)

(56) References Cited

U.S. PATENT DOCUMENTS

| | | | | |
|---|---|---|---|---|
| 5,462,452 A | * | 10/1995 | Devine | 439/505 |
| 6,100,643 A | * | 8/2000 | Nilssen | 315/209 R |
| 6,179,665 B1 | * | 1/2001 | Rossman et al. | 439/654 |
| 6,573,617 B2 | * | 6/2003 | Jones et al. | 307/36 |
| 6,747,859 B2 | * | 6/2004 | Walbeck et al. | 361/93.1 |
| 6,771,775 B1 | * | 8/2004 | Widmer | 379/413.04 |
| 7,675,190 B1 | * | 3/2010 | Muller et al. | 307/3 |
| 2004/0120168 A1 | * | 6/2004 | Miles | 363/44 |
| 2007/0165017 A1 | * | 7/2007 | Kubota et al. | 345/211 |

FOREIGN PATENT DOCUMENTS

| | | | | |
|---|---|---|---|---|
| JP | 4-154204 A | * | 5/1992 | H03H 7/09 |
| JP | 2006-166689 A | | 6/2006 | |
| KR | 20-0325612 Y1 | | 8/2003 | |
| KR | 10-2005-0036557 A | | 4/2005 | |
| WO | WO 0143238 A1 | * | 6/2001 | |

OTHER PUBLICATIONS

Machine translation for EP0090774.*

* cited by examiner

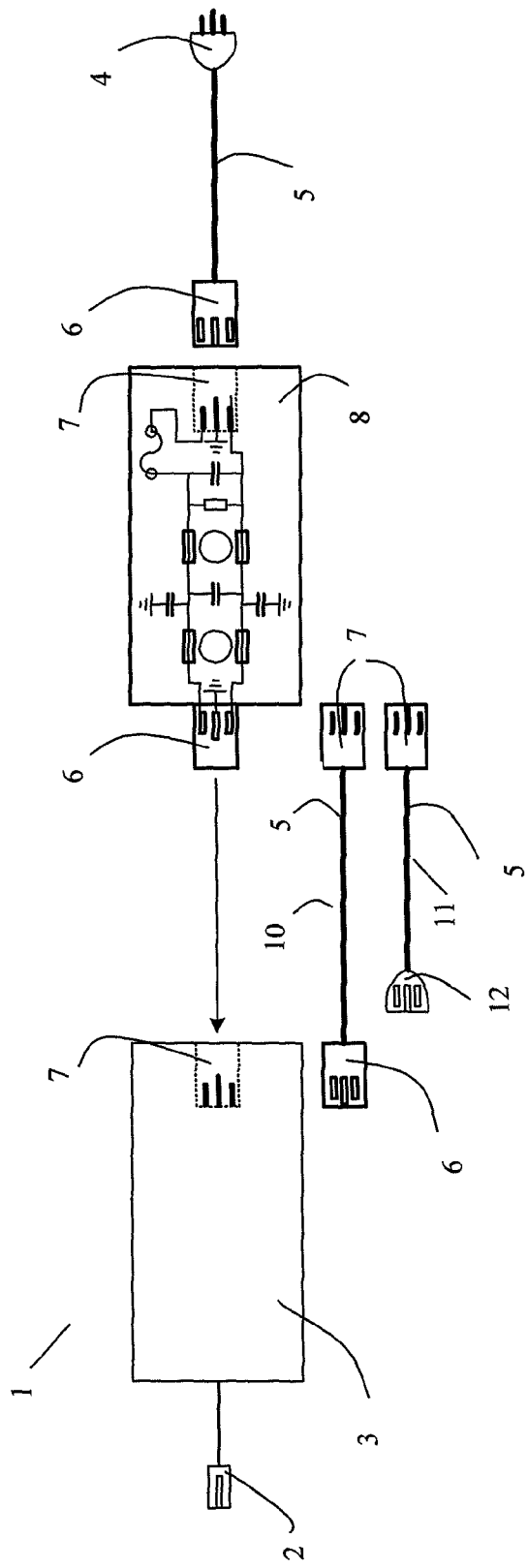
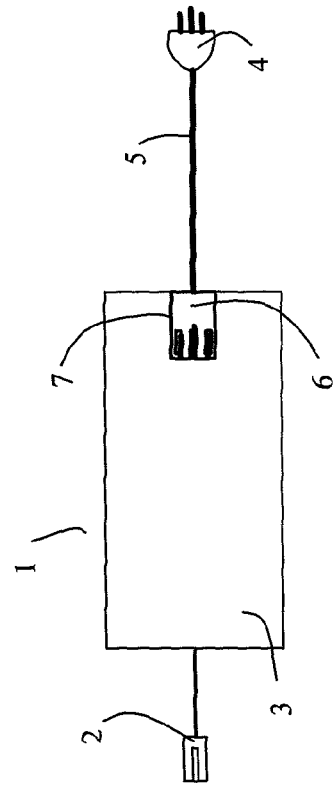
Figure 1
Figure 2

AC MAINS FILTER AND POWER SUPPLY SYSTEM

CROSS-REFERENCE TO RELATED APPLICATION

This application claims priority from U.S. Provisional Application No. 60/982,215 filed on Oct. 24, 2007 in the United States Patent Office, the disclosure of which is incorporated herein in its entirety by reference.

BACKGROUND OF THE INVENTION

1. Field of the Invention

The present invention relates to a filter and power supply system, and more particularly a filter that can be connected to AC powered devices, wherein the filter can be easily interchanged.

2. Description of the Related Art

Industry has been using AC powered devices which suffer performance degradation that is caused from noise that is present on the mains power circuit. Devices powered from the mains power circuit can generate noise that is then distributed onto the mains power circuit.

The power conversion devices in the related art do not allow for selection of specified noise frequencies that affect performance of the supplied products. For e.g. in an audio system, data modem or television, the magnitude of noise on the analog signals detrimentally affects performance. These power conversion devices are not designed to prevent generating noise due to the distance between devices and are not configurable to achieve the highest performance possible.

Currently, device filters contained within the devices are not removable. Accordingly, if a device receives power line interference, there is no easy way of eliminating that noise unless a filter is built into the system. Additionally, the cost of adding filters to each device for possible use is prohibitively expensive. Accordingly, a fault in a filter cannot be easily fixed. Rather, due to a faulty filter, the performance of the whole device is affected requiring replacement of the whole device leading to a large cost. Additionally, these devices cannot be easily modified as the functions of the filters cannot be easily altered.

SUMMARY OF THE INVENTION

Accordingly, the present invention has been made to solve the above-mentioned problems occurring in the related art, and an aspect of the present invention is to provide a filter that can be connected to AC powered devices, wherein the filter can be easily interchanged to improve performance of AC devices.

Additional advantages, aspects, and features of the invention will be set forth in part in the description which follows and in part will become apparent to those having ordinary skill in the art upon examination of the following or may be learned from practice of the invention.

The power supply system includes a filter with at least a first and second connector, wherein the first connector is connected to a power source and the second connector is connected to power supply.

In another aspect of the present invention, at least one of the filter connectors is a female connector.

In another aspect of the present invention, the second connector is connected to the power supply by a cable.

In another aspect of the present invention, the second connector fits in a connector in the power supply.

In another aspect of the present invention, the power supply is a switched-mode power supply.

In another aspect of the present invention, a power supply system includes a first filter with at least a first and second connector, a second filter with at least a third and fourth connector, wherein the first connector is connected to a power source, wherein the first filter is connected to the second filter, and the fourth connector is connected to a power supply.

In another aspect of the present invention, the first filter is connected to the second filter by the second and third connectors.

In another aspect of the present invention, the first filter is connected to the second filter by a cable.

In another aspect of the present invention, the first filter and the second filter have different characteristics.

In another aspect of the present invention, one of the first and second filters negates only high frequency noise and the other of the first and second filters negates only low frequency noise.

In another aspect of the present invention, a filter includes a housing, a male connector, and a female connector.

In another aspect of the present invention, the male connector can be connected to an AC power source and the female connector can be connected to power supply.

In another aspect of the present invention, the filter further includes a breaker.

In another aspect of the present invention, the female connector is a C13 connector and the male connector is a C14 connector.

In another aspect of the present invention, a filter includes a first filter with a housing, a male connector, and a female connector, and a second filter includes a housing, a male connector, and a female connector, wherein the male connector of the first filter can be connected to the female connector of said second filter.

In another aspect of the present invention, the female connectors are C13 connectors and the male connectors are C14 connectors.

BRIEF DESCRIPTION OF THE DRAWINGS

The above and other objects, features and advantages of the present invention will be apparent from the following detailed description taken in conjunction with the accompanying drawings, in which:

FIG. 1 illustrates the components of a power supply system according to an exemplary embodiment of the present invention FIGS. 2-6 illustrate various exemplary embodiments with varying configurations based on the system illustrated in FIG. 1;

DETAILED DESCRIPTION OF EXEMPLARY EMBODIMENTS

Figure 3:
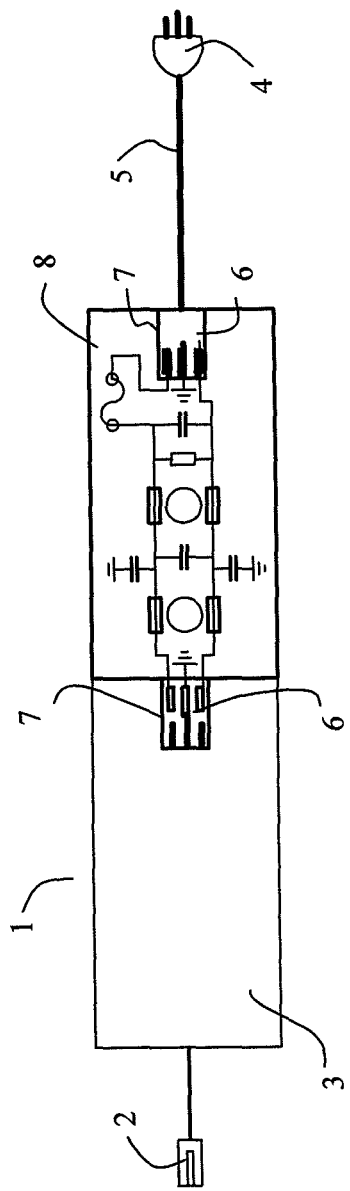

Advantages and features of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

FIG. 1 is an illustration of a power device system 1 according to an exemplary embodiment of the present invention. A modem connector/adapter 2 (although this embodiment is intended to connect to a modem, the embodiments are not limited to connections to modem) is connected to power supply, such as a switched-mode power supply (SMPS) 3. An example of an SMPS 3 may have approximate dimension of 4.32"×1.970"×1.245" with an input of 100-120 VAC 1.0 A 50-60 Hz and output 12.0 VDC 2.9 A. One of ordinary skill in the art would comprehend that the modem may be replaced by any other suitable device and the power supply may vary as well. The power supply has a male socket 7. A connector 6 with female parts corresponding to the male socket 7 on the SMPS 3 can be input into the male socket 7. The connector 6 is attached to a filter 8. The filter 8 in this exemplary embodiment is a dual stage power line filter. The filter 8 also consists of a male socket 7. An AC plug 4 provided with Mains AC Power is attached by way of a conductor 5 to a connector 6. This connector 6 can be input in any male socket 7. However, in FIG. 1 it is illustrated next to the male socket 7 of the filter 8.

FIG. 1 further illustrates an inner connect auxiliary cable 10 which contains a male socket 7 and a connector 6 with female parts connected to each other with a conductor 5. The inner connect auxiliary cable 10 may be used with any of the configurations presented below in FIG. 2-4 to provide flexibility in the arrangement and configuration. By way of example, in the Mains AC Powered Device 1 of FIG. 1, the male socket 7 of the inner connect auxiliary cable 10 can be connected to the connector 6 of the filter 8 and the connector 6 of the inner connect auxiliary cable 10 is connected to the male socket 7 of the SMPS 3. Accordingly, with the presence of the inner connect auxiliary cable 10, the SMPS 3 and the filter 8 are connected electronically as they would have been if they were directly connected. This configuration of inner connect auxiliary cable 10 can be applied to anywhere where a male socket 7 and connector 6 are inter-connected.

FIG. 1 also illustrates an auxiliary power cable assembly 11. The auxiliary power cable assembly 11 comprises of a male socket 7 and a AC receptacle 12 which corresponds to an AC plug 4, connected by a conductor 5.

FIGS. 2-6 illustrate various exemplary embodiments with varying configurations based on the system illustrated in FIG. 1

FIG. 2 illustrates an exemplary embodiment of the present invention in which no filter is used. FIG. 2 illustrates a Mains AC Powered Device 1 which contains a modem connector 2 connected to SMPS 3. The Mains AC Power 4 is connected to a connector 6 by means of a conductor 5. The connector 6 contains female parts and plugs into a corresponding male socket 7 in the SMPS 3. Essentially, this configuration produces a standard power supply for appliances or devices. The SMPS 3 is provided with an AC power by the Mains AC Power 4 by way of a removable connection based on the connector 6.

FIG. 3 illustrates another exemplary embodiment of the present invention wherein a filter 8 is added to the configuration presented in FIG. 2. Accordingly, a Mains AC powered device 1 which contains a modem connector 2 is connected to SMPS 3. The Mains AC Power 4 is connected to a connector 6 by mean of a conductor 5. The connector 6 contains and plugs into a corresponding male socket 7 of the filter 8. Furthermore, a female connector 6 provided in the filter 8 plugs into corresponding male part 7 in the SMPS 3. Essentially this configuration allows for addition of an inline power filter that uses the same AC cord that the switch mode power supply uses. Accordingly, by the use of the connector 6 on the filter 8, the filter block can be directly plugged into an appliance, in this case a SMPS 3. So all a user has to do is take a filter 8 and plug it directly onto the appliance. The SMPS 3 is provided with an AC power by the Mains AC Power 4 by way of a removable connection based on the connector 6.

Figure 4:
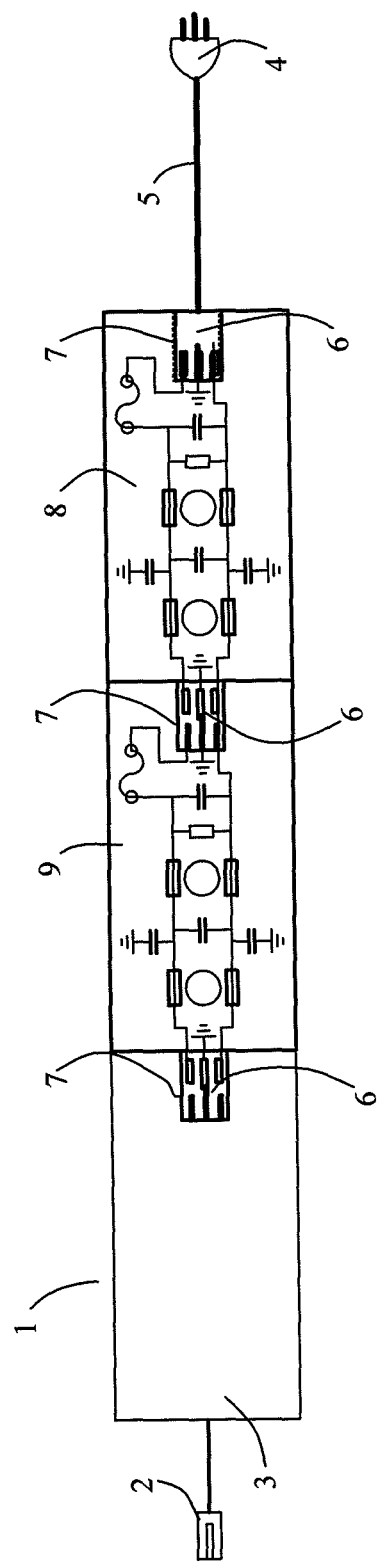

FIG. 4, displays another exemplary embodiment of the present invention. FIG. 4, illustrates the solution for a scenario in which the configuration presented in FIG. 3 does not cure the problems with power line generated noise. Accordingly, there is a need for an additional filter. Therefore, additional filter 9 is serially added within the device. The connector 6 of filter 8 connects to male socket 7 of filter 9, while the connector 6 of filter 9 connects to the male counterpart in SMPS 3. Accordingly, a cascading of the noise filters is done leading to increase or doubling of the filtering capability.

One of ordinary skill in the art would comprehend that numerous filters could be added using the configuration and the methods illustrated above. Additionally, the plurality of filters that are used may have different characteristics of noise. By way of example, in FIG. 4, filter 8 could be a high frequency noise filter and filter 9 could be a low frequency noise filter. Accordingly, if both of these filters are used together, one would cancel the high frequency and the other would cancel the low frequency. Accordingly, a band-pass filter can be implemented. However, the filters are not limited to these characteristics and many different variations can be implemented based on the technical requirements.

Therefore, as illustrated by the exemplary embodiments provided above, the presence of the connectors 6 with female parts on the respective filters provides the flexibility to removably place the filter anywhere in the AC line. Accordingly, in another exemplary embodiment of the present invention (not illustrated), further filters can simply be cascaded using the methods and configuration described above allowing the filtering to be conducted in various methods. Essentially additional filters can be cascaded together to implement desired filtering. Accordingly, by a method of cascading, multiple filters can be serially in line with the power cable or cord.

Figure 5:
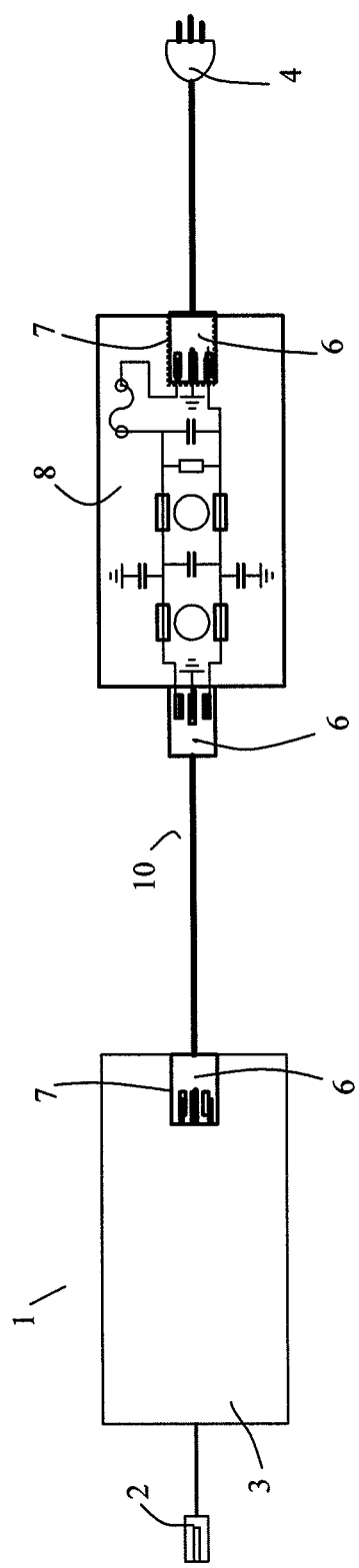

FIG. 5 illustrates the use of an inner connect auxiliary cable 10 according to another exemplary embodiment of the present invention. The male socket 7 of the inner connect auxiliary cable 10 is connected to the connector 6 of the filter 8 and the connector 6 of the inner connect auxiliary cable 10 is connected to the male socket 7 of the SMPS 3. Accordingly, with the presence of the inner connect auxiliary cable 10, the SMPS 3 and the filter 8 are electronically connected as they would have been if they were directly connected. This configuration of inner connect auxiliary cable 10 can be applied to anywhere where a male socket 7 and connector 6 are inter-connected. The use of the inner connect auxiliary cable 10 and especially the wire 6, which might be a rubberized cord allows for further flexibility in the use of a filter 8. By way of example, if the filter 8 is to be applied to a TV, it can simply be attached using a wire 6, instead of the whole Mains AC Powered Device 1 having to be placed behind the TV.

Figure 6:
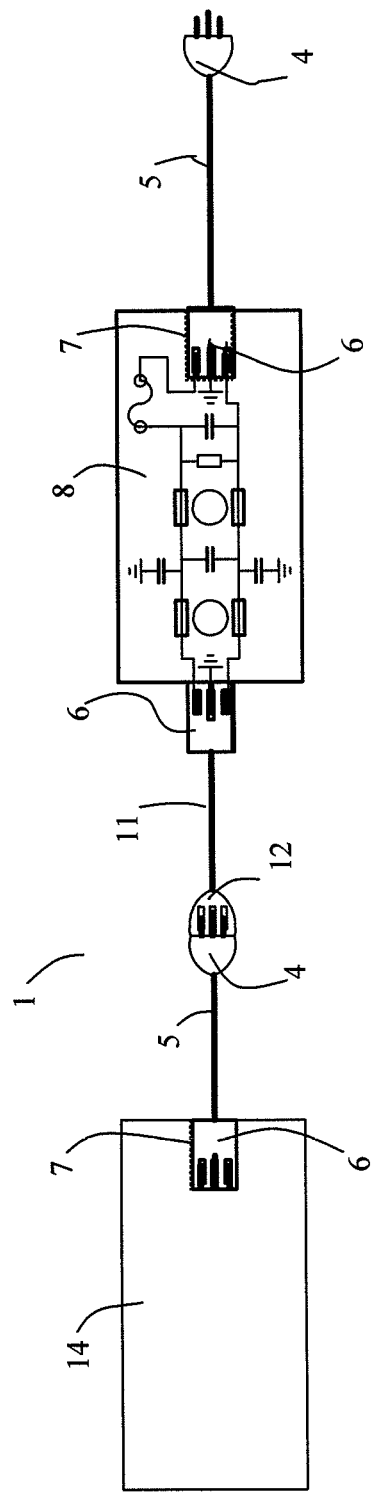

FIG. 6 illustrates the use of auxiliary power cable assembly 11 according to another exemplary embodiment of the present invention. The male socket 7 of the auxiliary power cable assembly 11 is connected to the connector 6 of the filter 8, while the AC receptacle 12 is connected to a AC plug 4 connected by a conductor 5 to a device 14.

The configurations and methods applied to the filters with respect to the connectors 6 and the male sockets 7 in exemplary embodiments of the present invention can be used with varying type of filters and are not limited to the filters illustrated in the exemplary embodiments.

Figure 7:
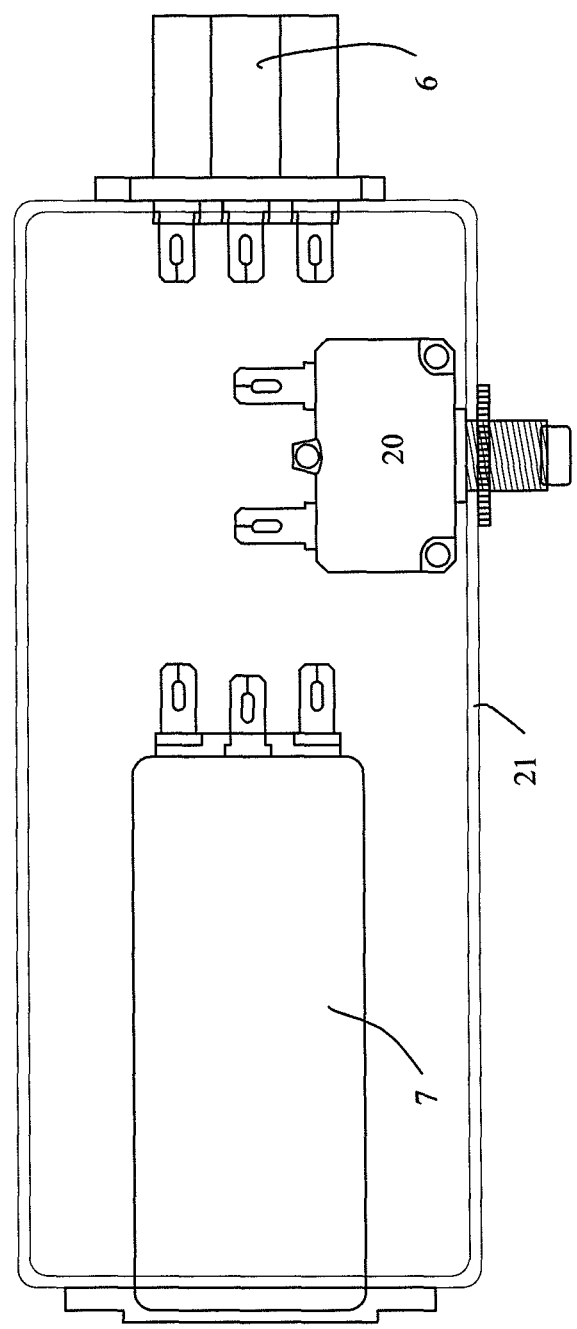
FIGS. 7-8 illustrate the filter and its wiring on the inside accordingly to an exemplary embodiment of the present invention.
Figure 8:
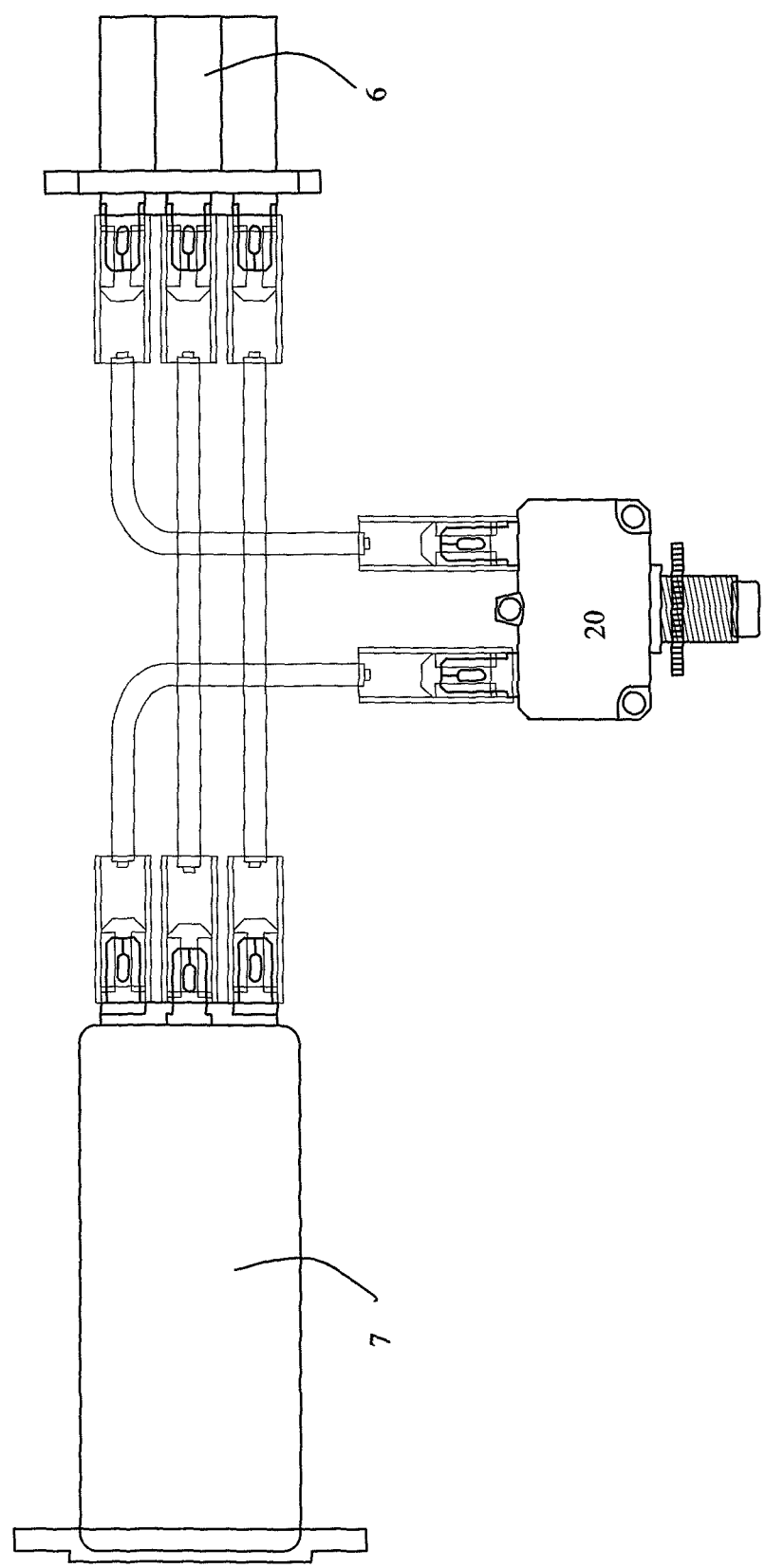

FIG. 7 illustrates an inside of the filter 8 and FIG. 8 illustrates a wiring diagram of the inside of a filter 8 accordingly to an exemplary embodiment of the present invention. The connector 6, such as a C13 connector, and the male socket 7, such as a C14 connector, are illustrated. The filter contains a non-conductive housing 21 on the outside. The filter further includes a breaker 20. While the filter 8 does not necessary require a breaker 20, it can be beneficial to put one in, so as to protect the circuits and minimize the chances of a fire.

Tables 1 and 2 below illustrate exemplary filter specifications of the filter used in an exemplary embodiment of the present invention.

TABLE 1

| | FREQ (MHz) | | | | |
|---|---|---|---|---|---|
| | .15 | .5 | 1 | 10 | 30 |
| Insertion Loss characteristics (50/50 Ohm) @6 AMP | | | | | |
| CM (dB) | 30 | 50 | 60 | 60 | 60 |
| DM (dB) | 26 | 40 | 60 | 60 | 55 |
| Insertion Loss characteristics (50/50 Ohm) @10 AMP | | | | | |
| CM (dB) | 28 | 40 | 50 | 55 | 55 |
| DM (dB) | 26 | 38 | 55 | 60 | 60 |
| Insertion Loss characteristics (50/50 Ohm) @20 AMP | | | | | |
| CM (dB) | 18 | 35 | 45 | 50 | 58 |
| DM (dB) | 16 | 35 | 55 | 55 | 70 |

TABLE 2

| Insertion Loss characteristics (50/50 Ohm) @1 AMP | | | | | |
|---|---|---|---|---|---|
| | FREQ (MHz) | | | | |
| | .15 | .5 | 1 | 10 | 30 |
| CM (dB) | 52 | 60 | 65 | 65 | 50 |
| DM (dB) | 28 | 45 | 65 | 65 | 55 |

Operating Frequency: DC - 60 Hz.
Operating Voltage: 250 V +10%.
Operating Current: 1 Amp (Ycap = 0, Leakage = 0 ma 120 V/60 Hz) [TBD]
Ambient temperature: 40 C. Climactic Catagory: 25/100/21.
Inrush Rating: 20 × (10 mS), 1.5 × (1.5 min).
Hipot Rating: 2200VDC Safety Approvals: cCSAus/UR/EN133200.
Weight: TBD
Physical Size: Approx 4.320" × 1.970" × 1.245" (target size is same as SMPS).

One of ordinary skill in the art would comprehend that the structure can be slightly altered to implement the principles of the present invention to produce similar results.

In another exemplary embodiment (not illustrated) of the present invention, the device may have varying configurations and ground is isolated outside the device.

As described above, according to the exemplary embodiment of the present invention, filters can be interchangeably easily configured thus the performance of a power device can be easily improved.

Although exemplary embodiments of the present invention have been described for illustrative purposes, those skilled in the art will appreciate that various modifications, additions and substitutions are possible, without departing from the scope and spirit of the invention as disclosed in the accompanying claims. The foregoing embodiments are merely exemplary and are not to be construed as limiting the present invention. Therefore, the scope of the present invention should be defined by the accompanying claims and their legal equivalents.

What is claimed is:

1. A power supply system comprising:
    an interchangeable external dual stage power line filter comprising at least a first external connector attached to a housing and a second external connector attached to the housing;
    wherein said first external connector is connected to an AC power source and said second external connector is connected to an external connector of a power supply,
    wherein said interchangeable external dual stage power line filter provides filtered AC power from the AC power source to the power supply,
    wherein said second external connector is removably connected to said external connector of said power supply by a 3-conductor cable,
    wherein said interchangeable external dual stage power line filter is one of a high frequency noise filter and a low frequency noise filter, and
    wherein said interchangeable external dual stage power line filter is contained in the housing and configured to be removably attached to one or more other filters by another 3-conductor cable or directly, in a cascading manner.

2. The system of claim 1, wherein said at least one of the connectors is a female connector.

3. The system of claim 1, wherein the power supply is a switched-mode power supply.

4. A power supply system comprising:
    a first interchangeable external filter contained in a first housing comprising at least a first external connector attached to the first housing and a second external connector attached to the first housing;
    a second interchangeable external filter contained in a second housing comprising at least a third external connector attached to the second housing and a fourth external connector attached to the second housing;
    wherein said first external connector is configured to be connected to a power source by a first 3-conductor cable;
    wherein said first interchangeable external filter is removably connected to said second interchangeable external filter by a second 3-conductor cable or directly; and
    wherein said fourth external connector is configured to be removably connected to an external connector of a power supply by a third 3-conductor cable or directly.

5. The system of claim 4, wherein said first interchangeable external filter is removably connected to said second interchangeable external filter by said second and third connectors.

6. The system of claim 4, wherein said first interchangeable external filter is removably connected to said second interchangeable external filter by said second 3-conductor cable.

7. The system in claim 4, wherein said first interchangeable external filter and said second interchangeable external filter have different characteristics.

8. The system in claim 4, wherein at least one of the first and second interchangeable external filters negates only high frequency noise and the other of said first and second interchangeable external filters negates only low frequency noise.

9. An interchangeable filter comprising:
    a housing enclosing at least one filter;
    a male external connector attached to the housing; and a female external connector attached to the housing;

wherein said at least one filter is disposed between the male external connector and the female external connector and electrically connected to the male external connector and the female external connector, wherein said male external connector is configured to be electrically connected to an AC power source by a first 3-conductor cable, wherein said at least one filter outputs filtered AC power from the AC power source through another 3-conductor cable removably connected to the female external connector or directly, and wherein said at least one filter is configured to be removably attached to one or more other filters by the other 3-conductor cable or directly, in a cascading manner.

10. The interchangeable filter of claim 9, further comprising a breaker disposed within the housing, wherein the breaker is electrically connected to a contact of the male external connector and a contact of the female external connector.

11. The filter of claim 9, wherein said female external connector is a C13 connector and said male external connector is a C14 connector.

12. A filter comprising:
a first interchangeable external filter comprising:
a first housing;
a first male external connector attached to the first housing; and
a first female external connector attached to the first housing; and
a second interchangeable external filter comprising:
a second housing;
a second male external connector attached to the second housing; and
a second female external connector attached to the second housing;
wherein said first male external connector of said first interchangeable external filter is adapted to removably connect to said second female external connector of said second interchangeable external filter with a 3-conductor cable.

13. The filter of claim 12, wherein said first and second female external connectors are C13 connectors and said first and second male external connectors are C14 connectors.

14. The filter of claim 12, wherein said first interchangeable external filter and said second interchangeable external filter have different characteristics.

15. The filter of claim 12, wherein at least one of the first and second interchangeable external filters is one of a high frequency noise filter and a low frequency noise filter and the other of said first and second interchangeable external filters is the other of the high frequency noise filter and the low frequency noise filter.

* * * * *